United States Patent
Mullender et al.

(10) Patent No.: US 7,565,489 B2
(45) Date of Patent: Jul. 21, 2009

(54) IDENTIFYING RELEVANT DATA TO CACHE

(75) Inventors: Maarten Willem Mullender, Duvall, WA (US); Ricard Roma i Dalfó, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 307 days.

(21) Appl. No.: 11/173,688

(22) Filed: Jul. 1, 2005

(65) Prior Publication Data
US 2007/0005892 A1 Jan. 4, 2007

(51) Int. Cl.
*G06F 12/00* (2006.01)

(52) U.S. Cl. .................................................... 711/118

(58) Field of Classification Search ........................ None
See application file for complete search history.

(56) References Cited

U.S. PATENT DOCUMENTS

| | | | |
|---|---|---|---|
| 6,115,718 A * | 9/2000 | Huberman et al. | 707/102 |
| 6,243,755 B1 * | 6/2001 | Takagi et al. | 709/229 |
| 6,438,575 B1 * | 8/2002 | Khan et al. | 709/200 |
| 6,529,948 B1 * | 3/2003 | Bowman-Amuah | 709/217 |
| 7,003,566 B2 * | 2/2006 | Codella et al. | 709/224 |

\* cited by examiner

*Primary Examiner*—Kevin L Ellis
*Assistant Examiner*—Eric Loonan
(74) *Attorney, Agent, or Firm*—Workman Nydegger

(57) ABSTRACT

The present invention extends to methods, systems, and computer program products for identifying relevant information to cache. A computer system accesses a marked data entity that has been marked for caching at a client computer system. The marked data entry is marked for caching based on the relevance of the marked data entity from the perspective of a requested data entity. The computer system identifies relationships from the marked data entity to one or more other data entities. The computer system selects, from among the identified relationships, any relationships that satisfy a relevance threshold from the perspective of the requested data entity. The computer system identifies, from among the one or more other data entities, any of the other data entities that correspond to a selected relationship satisfying the relevance threshold. The computer system marks the identified other data entities for caching.

15 Claims, 4 Drawing Sheets

```
┌─────────────────────────────────────────────────────┐
│ Accessing A Marked Data Instance That Has Been      │
│ Marked For Caching At A Client Computer System      │
│ Based On The Relevance Of The Marked Data Instance  │
│ From The Perspective Of A Requested Data Instance   │
└─────────────────────────────────────────────────────┘
                          │
                          ▼
┌─────────────────────────────────────────────────────┐
│ Identifying Relationships From The Marked Data       │
│ Instance To One Or More Other Data Instances        │
└─────────────────────────────────────────────────────┘
                          │
                          ▼
┌─────────────────────────────────────────────────────┐
│ Selecting, From Among The Identified Relationships, │
│ Any Relationships That Satisfy A Relevance          │
│ Threshold From The Perspective Of The Requested     │
│ Data Instance                                        │
└─────────────────────────────────────────────────────┘
                          │
                          ▼
┌─────────────────────────────────────────────────────┐
│ Identifying, From Among The One Or More Other Data  │
│ Instances, Any Of The Other Data Instances That     │
│ Correspond To A Selected Relationship Satisfying    │
│ The Relevance Threshold                             │
└─────────────────────────────────────────────────────┘
                          │
                          ▼
┌─────────────────────────────────────────────────────┐
│ Marking The Identified Other Data Instances For Caching │
└─────────────────────────────────────────────────────┘
```

IDENTIFYING RELEVANT DATA TO CACHE

CROSS-REFERENCE TO RELATED APPLICATIONS

Not applicable.

BACKGROUND OF THE INVENTION

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

Networks have in fact become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In some network computing environments, content, such as, for example, electronic mail messages, documents, or account information, are stored in a network accessible database maintained at a server computer system. Client computer systems communicate electronically with the server to manipulate content stored in the database. For example, a user can enter commands causing a client computer system to retrieve account information for a specified client from a network accessible database. The user can then manipulate the account information and send the manipulated account information back to the network accessible database for storage. Advantageously, the manipulated account information is then accessible to any number of other users who can make further changes.

However, network based (or "online") interaction with centrally stored content is at least in part dependent on network connectively. Thus, when network connectively degrades (e.g., available bandwidth is reduced, connectively is intermediately interrupted, or connectively is lost) accessing and manipulating network based content can become difficult, if not impossible. Accordingly, various techniques have been developed to facilitate seamless interaction with networked based content even when network connectively degrades (and a client is relegated to "offline" operation).

For example, caching is one commonly used technique for facilitating seamless interaction with network based content when network connectively degrades. Generally, caching involves storing frequently requested data at a location where the data can be quickly (and often locally) retrieved. For example, an administrator can configure settings that cause a client computer system to store network based content locally. Thus, a user of the client computer system has access to the networked based content even when network connectively degrades. Caching also facilitates more efficient access, since locally stored content can be accessed more efficiently than data stored at a remote database.

Caching network based content is typically dependent on how an administrator configures cache settings. For example, an administrator may be able to configure settings such that content from a network based database is or is not locally cached at client computer systems. However, the granularity of cache configuration settings is often limited. Thus, an administrator may find it difficult, if not impossible, to configure cache settings such that only relevant portions of content are cached at each client computer system.

Accordingly, to provide a user with relevant cached content, an administrator may have to configure cache settings such that large quantities of other non-relevant content are also cached. For example, to cache relevant accounts for a particular account manger, cache settings may need to be configured such that all accounts are cached at the account manger's client computer system, even accounts not associated with the account manager. This is unfortunate, since large quantities of non-relevant content consume system resources and provide little if any benefit to a user. As a result, client computer systems that lack the necessary resources may be prevented from caching content at all. Further, a user of a client computer system may not want non-relevant content and may choose not to cache any content. For example, in some environments, offline space may be limited and synchronization processes may be inconvenient because it takes to long to take all the content offline.

Some caching mechanisms allow users to reduce the amount of offline content by subscribing to specific information. However, obtaining relevant content may require the user to change their subscription at frequent intervals. For example, a user may receive frequent tasks requiring that they work with specific customers for a brief period of time. Thus, to cache relevant customer content (orders, history, unpaid bills, etc.), a user may be required to change their subscription each time a task is assigned and each time a task is completed. Further, even relevant information for a specific customer can change as different portions of a task are completed. For example, after auditing a customer's bills, unpaid bills data may no longer be relevant. However, until a corresponding subscription is updated this content may continue to be cached. Thus, configuring cache subscriptions to cache only relevant content is a highly manual operation. As a result, cache subscriptions are often not used.

BRIEF SUMMARY OF THE INVENTION

The foregoing problems with the prior state of the art are overcome by the principles of the present invention, which are directed towards methods, systems, and computer program products for identifying relevant data to cache. A computer system accesses a marked data entity that has been marked for caching at a client computer system. The marked data entry is marked for caching based on the relevance of the marked data entity from the perspective of a requested data entity. The computer system identifies relationships from the marked data entity to one or more other data entities. The computer system selects, from among the identified relationships, any relationships that satisfy a relevance threshold from the perspective of the requested data entity. The computer system identifies, from among the one or more other data entities, any of the other data entities that correspond to a selected relationship satisfying the relevance threshold. The computer system marks the identified other data entities for caching.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
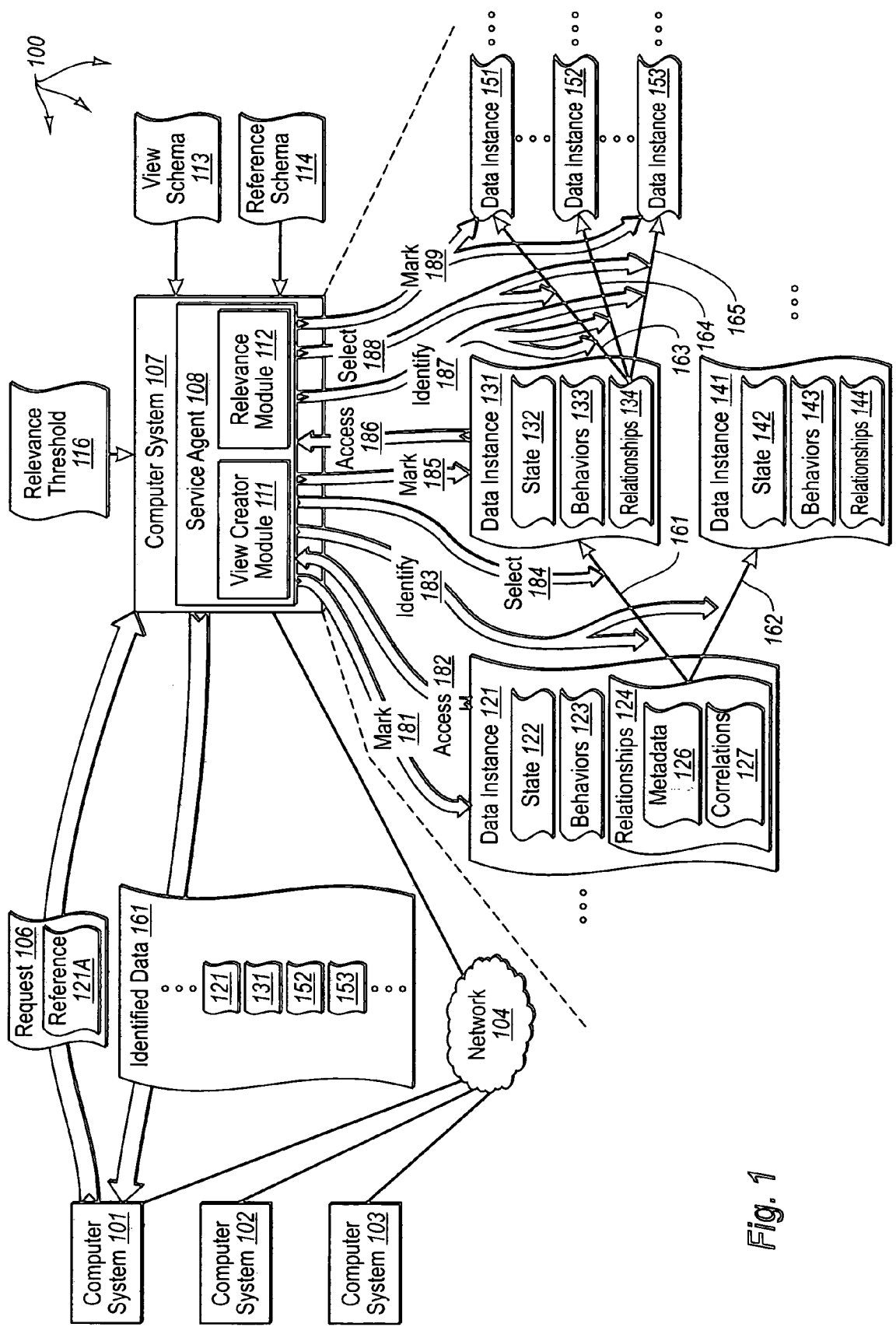
FIGS. 1 illustrates an example of a computer architecture that facilitates identifying relevant information to cache.

The principles of the present invention provide for identifying relevant data to cache. A computer system accesses a marked data entity that has been marked for caching at a client computer system. The marked data entry is marked for caching based on the relevance of the marked data entity from the perspective of a requested data entity. The computer system identifies relationships from the marked data entity to one or more other data entities. The computer system selects, from among the identified relationships, any relationships that satisfy a relevance threshold from the perspective of the requested data entity. The computer system identifies, from among the one or more other data entities, any of the other data entities that correspond to a selected relationship satisfying the relevance threshold. The computer system marks the identified other data entities for caching.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In the description and in the following claims, a "data class" is defined as a class of data, such as, for example, customers, orders, problem reports, etc, that can be instantiated. A data class can define a combination of state, behavior, and relationships to other data. Classes.

In the description and in the following claims, a "data instance" is defined as an instance of a data class. For example, customer 4711 can be an instance of a customer data class.

In this description and in the following claims, a "view" is defined as a snapshot of a data instance from a specified view point. A view schema can be utilized to expose attributes and properties of data classes for obtaining views. Thus, view formats can be formally and generally defined. Views can be used to present a subset of data instance information. For example, a view of a customer data instance can present name and address information even though the customer data instance (i.e., an instance of a customer data class) includes a variety of other information (telephone numbers, payment history, credit scores, etc.) as well. Alternately, views can also be used to present information from related and overlapping information from different data instances. For example, a view of an order may include a customer's name and address from a customer data instance as well as product descriptions from a product data instance (i.e., an instance of a product data class). Thus, views are views of data instances, for example, information related to an entity. A view may be a subset of a data instance, for example, when not all information is needed or even allowed. Alternately, a view can be a superset of a data instance, for example, if additional related information is included (e.g., customer name and product description in a view on an order instance).

In this description and in the following claims, a "reference" is defined as data used to identify one or more data instances of a data class. References can include or more data items used to identify data instances. For example, customers can be uniquely identified by tax number, DUNS number, etc. Alternately, a list of customers can be identified by zip code, region, account, manger, etc.

References can be used to formulate queries to services, such as, for example, a list of data instance attributes or a formulation of a set of conditions. A reference can include a combination of required and optional attributes. Thus, clients that have different reference information can flexibly obtain similar views of data instances and utilize the same actions through the same interfaces. A reference schema can be utilized to expose attributes and properties of data instances for identifying data instances. Thus, reference formats can be formally and generally defined.

In this description and in the following claims, a "relationship" is defined as information in one data instance that can be used to construct a reference to another data instance. For example, given a view an order data instances (e.g., representing a purchase order) it is possible to construct a reference to a corresponding customer data instance (the customer purchasing the products in the purchase order) based on information in the order data instance. That is, the order view can be transformed into a customer reference referring to the customer data instance. Relationships can be defined use both a view schema and a reference schema. Thus, relationships are not constrained to a single service and can be used to relate data instances encapsulated in different services.

Relationships can be statically defined in metadata, such as, for example, an express reference to some to data instance. For example, an order data instance can include an express reference (e.g., a pointer) to a customer data instance for a customer that submitted the order. Metadata defining a reference can describe how to take the reference and build a SOAP request. The SOAP request can then be sent to a service endpoint. In response to receiving the request, the service can then return a view on the entity, wrapped in a SOAP response. The metadata can further describe how to extract the view information from this response.

Alternately, a service agent can derive or infer relationships between data instances at run-time. For example, a service agent can determine (by parsing or some other mechanism) that the body of a document data instance contains a reference to a product data instance. Thus, the service agent infers that the product data is relevant to the document.

Accordingly, a combination of entities, views, references, and relationships can be utilized to semantically describe services. A semantic description of services can thus include data entities, their relationships to one another, as well as their behaviors. Based on a semantic description of services, information relevant to a particular user or a particular use can be identified as information that should be available in offline and low bandwidth environments. Relevance can be defaulted across all users, can be role based, or based on activity (e.g., current view, prior views, etc.).

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 that facilitates identifying relevant information to cache. Depicted in computer architecture 100 are computer systems 101, 102, 103, network 104, and computer system 107. Each of the computer systems 101, 102, 103, and 107 are connected to network 104, such as, for example, a Local Area Network ("LAN"), a Wide Area Network ("WAN"), or even the Internet. Computer systems connected network 104 can receive data from and send data to other computer systems connected network 104. Accordingly, computer systems 101, 103, 103, and 107, as well as other connected computer systems (not shown), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, computer systems 101, 102, 103, and 107 can create SOAP envelopes, exchange SOAP envelopes over network 104, and receive SOAP envelopes.

Each of computer systems 101, 102, and 103 can be computer systems configured to request and receive (potentially networked) data from other computer systems. Computer system 107 can be a computer system that is configured to receive requests and provide (potentially networked) data in response to requests. Thus, it may be that from time to time one or more of the computer systems 101, 102, and 103 request data from computer system 107.

Computer system 107 includes service agent 108 that is generally configured to provide relevant cacheable data to requesting computer systems in response to receiving a request. Service agent 108 is configured to mark and access data instances, such as, for example, any of data instances 121, 131, 141, 151, 152, and 153, instantiated from defined data entities. A series of three periods (an ellipsis) represents that service agent 108 can also access other data instances (not shown). Service agent 108 can mark portions of data instances, such as, data instance state (e.g., state 122, 132, and 142) and data instance behaviors (e.g., behaviors 123, 133, and 143), as information that is to be cached.

Service agent 108 is also configured to follow relationships (e.g., contained in relationships 124, 134, and 144) from one data instance to another data instance. As previously described, relationships can be statically represented in metadata (e.g., metadata 126) or can be dynamically derived or inferred at runtime (e.g., correlations 127). For clarity, not all of the data of each depicted data instance is illustrated. However, these data instances can include any information described for other data instances. For example, relationships 134 and 144 can include metadata and/or correlations. Likewise, any of data instances 151, 152, and 153 can include state, behaviors, relationships, metadata, and correlations.

Service agent 108 can expose methods and/or actions associated with data instances, such as, for example, "release order", "upgrade customer", etc. Some methods and actions can require input information obtained from views of other data instances. For example, a request to a supplier to create a sales order can be built using information from a purchase proposal data instance (i.e., an instance of a purchase proposal data entity). That is, a view on the purchase proposal date instance can be converted into a sales order request data instance (i.e., an instance of a sales order request data entity).

Presenting views of data instances can occur in response to a request from a client computer system. For example, computer system 101 can send request 106 requesting a specified view of data instance 121. Request 106 can include reference 121A identifying data instance 121. Alternately, it may be that reference 121A identifies some other data instance and data instance 121 is subsequently determined to be relevant to the other identified data instance.

Service agent 108 includes view creator module 111 and relevance module 112. View creator module 111 is configured to expose views of data instances, such as, for example, database entries, documents, etc. For example, view creator module 111 may be configured to provide various views of a customer database, such as, for example, an address view, a financial view, an historical view, etc. View schema 113 can be utilized to expose attributes and properties of data instances manipulated by view creator module 111.

Relevance module 112 is configured to determine the relevance of any other data instance to a requested data instance. View schema 113 and reference schema 114 can be utilized to expose attributes and properties of relationships between data instances.

As previously described, relevance can be determined in a similar manner for all users and uses of data instances or can vary based on a user or use. Further, relevance can be determined in accordance with relevance rules that define how related another data instance is to be to a requested data instance for the other data entity to be identified as relevant to the requested data instance. Data instances having increased relatedness to a requested data instance are more likely to be relevant to the requested data instance. On the other hand, data instances having decreased relatedness to a requested data instance are less likely to be relevant to the requested data instance.

One metric for determining relevance includes calculating the length of the path followed (or the "distance") between an accessed data instance and a requested data instance. For example, it may be that a view of an order data instance (e.g., data instance 121) is requested. The order data instance may include a reference (either static or derived at run-time), for example, relationship 161, to a customer data instance (e.g., data instance 131) representing the customer that submitted the order. Service agent 108 can follow the included reference to access the customer data instance. Thus, the distance between the order data instance (the requested data instance) and the customer date entity (the other data instance) is 1. If the customer data instance further includes a reference (e.g., relationship 164) to a financial report data instance (e.g., data instance 152), the distance between the order data instance and the financial report data instance is 2. Following further references, other data instance can be identified as having a distance of 3, 4, 5, etc., from the order instance.

A relevance threshold can be defined to indicate how related one data instance is to be to another data instance for the one data instance to be identified as relevant to the other data instance (and thus possibly marked to be cached along with the other data instance). In some embodiments, a relevance threshold is defined as a number (e.g., integer or floating point), such as, for example, 1, 2, 3, 4, 5, etc. The distance between two data instance can be compared to the relevance threshold to determine if one data instance is relevant to the other data instance. For example, when the distance between any other data instance and a requested data instance (e.g., number of references followed to get from the requested data instance to the other data instance) is within (e.g., is less than or equal to) the relevance threshold, service agent 108 determines that the other data instance is relevant to the requested data instance. On the other hand, when the distance between any other data instance and a requested data instance is not within (e.g., is greater than) the relevance threshold, service agent 108 determines that the other data instance is not relevant to the requested data instance.

Figure 2:
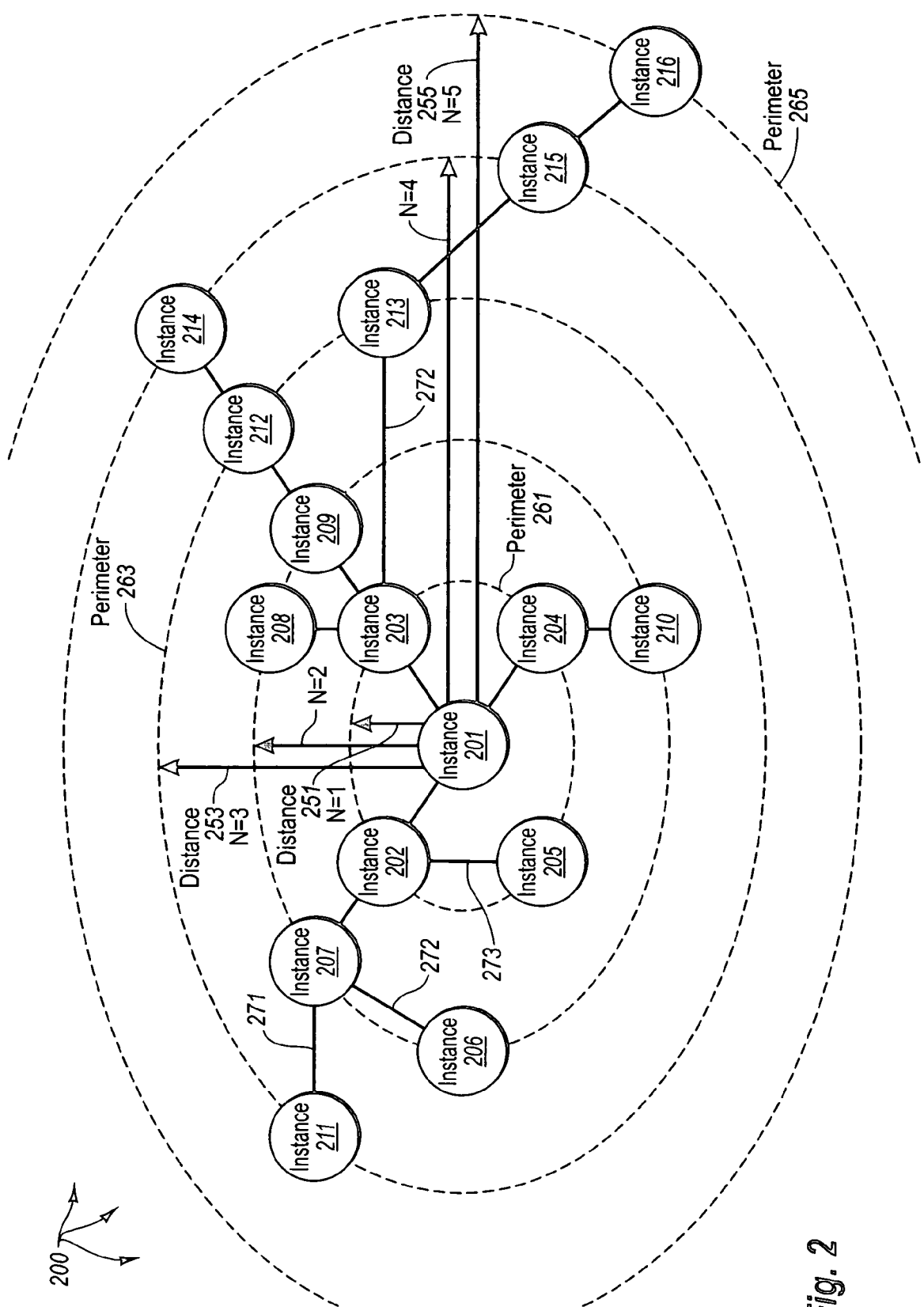
FIG. 2 illustrates an example of defined perimeters that can be used to determine relevance between data entities.

Thus, a relevance threshold essentially results in a perimeter around a requested data instance. Other data instances relevant to the requested data instance can be limited to those data instances within the perimeter. FIG. 2 illustrates an example of defined perimeters 200 that can be used to determine relevance between data instances. FIG. 2 depicts instances 201-216, which can be data instances as previously described.

Within FIG. 2, instance 201 can be viewed as a requested data instance. Distance 251 represents a relevance threshold (N) equals 1. The dashed line indicates that a perimeter 261 of distance 1 surrounds instance 201 and instances 202-205 are within perimeter 261. Thus, service agent 108 can identify instances 202-205 as being relevant to (and thus possible marked for caching along with) instance 201. On the other hand, service agent 108 can determine that instance 206-216 are not relevant to instance 201 (when N=1).

Distance 253 represents a relevance threshold (N) equals 3. The dashed line indicates that a perimeter 263 of distance 3 surrounds instance 201 and instances 202-213 are within perimeter 263. Thus, service agent 108 can identify instances 202-213 as being relevant to (and thus possible marked for caching along with) instance 201. On the other hand, service agent 108 can determine that instances 214-216 are not relevant to instance 201 (when N=3).

Distance 255 represents a relevance threshold (N) equals 5. The dashed line indicates that a perimeter 265 of distance 5 surrounds instance 201 and instances 202-216 are within perimeter 265. Thus, service agent 108 can identify entities 202-216 as being relevant to (and thus possible marked for caching along with) instance 201. Service agent 108 can determine that other data instances outside of perimeter 265 (not shown) are not relevant to instance 201 (when N=5).

It should be understood that a relevance threshold (e.g., relevance threshold 116) is not limited to numbers representing a perimeter around a requested data entity. For example, a relevance threshold can be a more complex relevance data structure including other relevance rule data, such as, for example, a user's role, a data entity type, purported data usage, etc. A number representing a perimeter distance may or may not be combined with other relevance rule data in a relevance data structure. For example, the relevance of a relationship can be determined by a relevance algorithm. A relevance algorithm can be configured in metadata referring to a piece of executable code that can return a relevancy.

As depicted in FIG. 2, some steps between instances do not cause a transition across relevance thresholds. For example, following relationship 273 does not cause a transition across a relevance threshold (i.e., the relevance threshold is still N=1). Similarly, following relationship 272 does not cause a transition across a relevance threshold (i.e., the relevance threshold is still N=2). Other steps between data instances can cause a transition across one relevance threshold. For example, following relationship 271 can cause a transition from relevance threshold N=2 to relevance threshold N=3. Yet other steps between instances can cause a transition across a plurality of relevance thresholds. For example, following relationship 274 causes a transition from relevance threshold N=1 to relevance threshold N=3.

Figure 3:
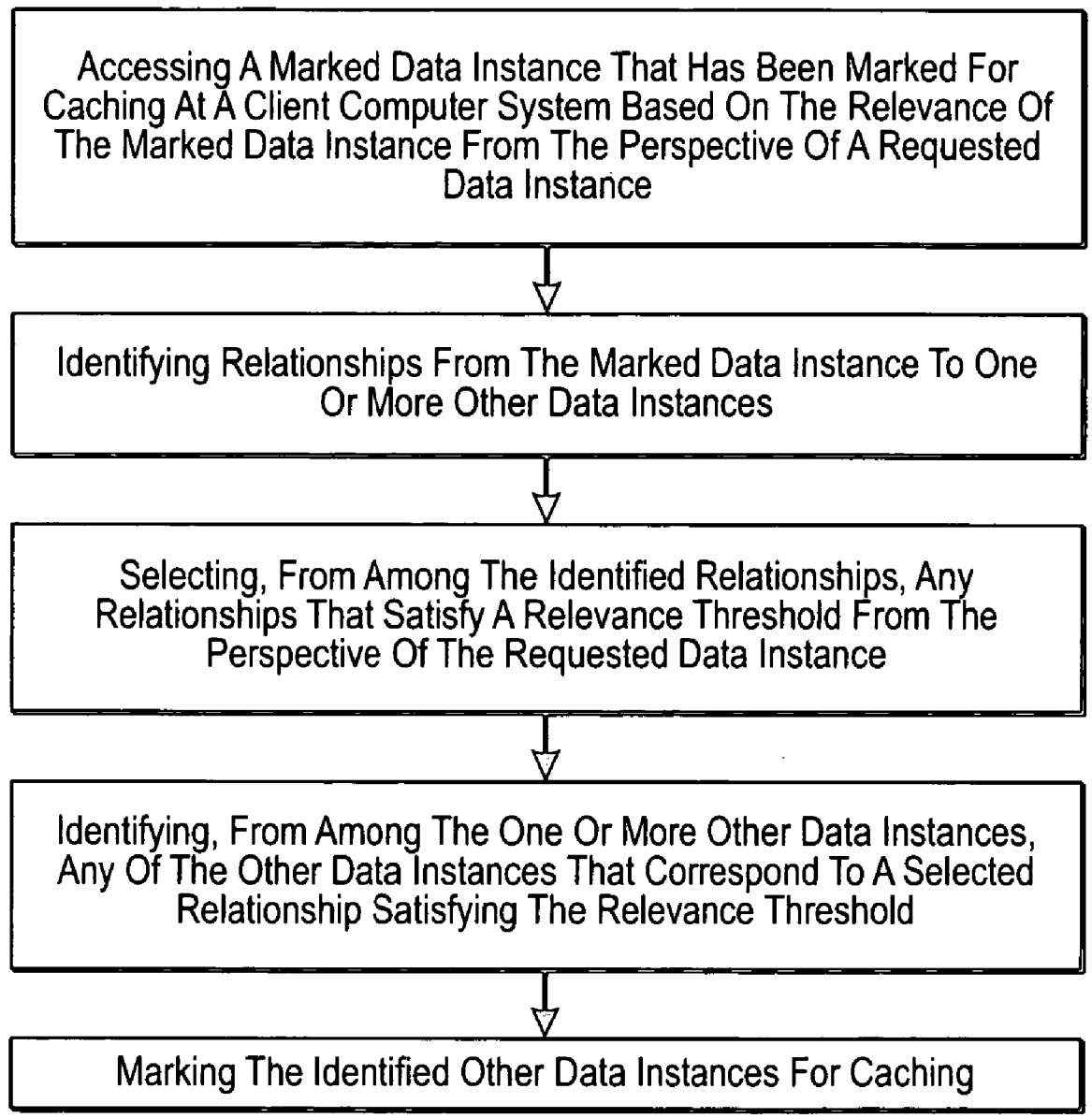
FIG. 3 illustrates an example flow chart of a method for identifying relevant information to cache.

FIG. 3 depicts an example flow chart of a method 300 for identifying relevant information to cache. The method 300 will be described with respect to the components and data in computer architecture 100.

Method 300 includes an act of accessing a marked data instance that has been marked for caching at a client computer system (act 301). The marked data instance can be Z marked based on the relevance of the marked data instance from the perspective of a requested data instance. For example, as indicated by access 182, service agent 108 can access data instance 121. Service agent 108 can access data instance 121 in response to data instance 121 being marked for caching at computer system 101.

As indicated by mark 181, service agent 108 can mark data entity 121 for caching at computer system 101. Service agent 108 can mark data entity 121 as result of data entity 121 being a requested data entity (e.g., identified by reference 121A). Alternately, service agent 108 can mark data entity 121 as a result of data entity 121 being identified as relevant to a requested data entity (e.g., some other data entity identified by reference 121A).

Method 300 includes an act of identifying relationships from the marked data entity to one or more other data entities (act 302). For example, as indicated by identify 183, service agent can identify relationships 161 and 162 from data entity 121 to data entities 131 and 141 respectively. Relationships 161 and 162 can be static relationships or dynamically derived and/or inferred relationships identified at run-time.

Method 300 includes an act of selecting, from among the identified relationships, any relationships that satisfy a relevance threshold from the perspective of the requested data entity (act 303). For example, as indicated by select 184, service agent 108 can select relationship 161 as a relationship satisfying a relevance threshold 116. Relationship 161 can be selected as satisfying relevance threshold 116 from the perspective of data entity 121. Alternately, relationship 131 can be selected as satisfying threshold 116 from the perspective of some other requested data entity to which data entity 121 is relevant. That is, relationship 131 may satisfy threshold 116 when viewed in combination with a relationship from some other (potentially requested) data entity to data entity 121.

Method 300 includes an act of identifying, from among the one or more other data entities, any of the other data entities that correspond to a selected relationship satisfying the relevance threshold (act 304). For example, service agent 108 can identify data entity 131 as corresponding to relationship 161.

Method 300 includes an act of marking the identified other data entities for caching (act 305). For example, service agent 108 can mark data entity 131 for caching.

The acts of method 300 can be repeated for each of identified other data entities, such as, for example, data entity 300. As indicated by access 186, Service agent 108 can access data entity 131. As indicated by identify 182, service agent 108 can identify relationships 163, 164, and 165 from data entity 131 to data entities 151, 152, and 153 respectively. As indicated by select 188, service agent 108 can select relationships 163 and 165 as satisfying relevance threshold 116 from the perspective of the requested data entity (e.g., data entity 121 or some other data entity that data entity 121 is relevant to). Service agent 108 can identify that data entities 151 and 153 correspond to relationships 163 and 165 respectively. As indicated by mark 189, service agent 108 can mark data entities 151 and 153 for caching.

The acts of method 300 can be further repeated for data entities 151 and 153 and for subsequent data entities until relevance threshold 116 is no longer satisfied. When no further data entities satisfy relevance threshold 116, any marked data entities can be transferred to computer system 101 for changing. For example, computer system 107 can transfer identified data 116, including at least data entities 121, 131, 152, and 153 to computer system 101. Computer system 101 can store any data entities included in identified data 121 such that computer system 101 has access to the, data entities in offline and low bandwidth environments.

In some embodiments, it may be that a data entity has a single view defined for it. In these embodiments, service agent 108 can receive a request (e.g., 106) for a requested data entity (e.g., data entity 121). Service agent 108 can create a view of the requested data entity. Service agent 108 can determine relevant relationships based on the contents of the requested data entity (e.g., state 122, behaviors 123, metadata 126, and correlations 127). Service agent 108 can build references (e.g., 161 and 162) to related data entities (e.g., data entities 131 and 141) based on the relevant relationships. Service agent 108 can access the related data entities. Service agent 108 can identify any related data entities that satisfy a relevance threshold (e.g., 116) from the perspective of the requested data entity. Service agent 108 can mark the identified data entities for caching. Service agent can cause marked data entities to be transferred (e.g., identified data 116).

In alternatively embodiments, a data entity may have a plurality of different views. In these alternative embodiments, service agent 108 can aggregate the plurality of different views into a single aggregate view such that the single aggregate view can be retrieved in a single operation. Service agent 108 can also be configured to separate an aggregate view into corresponding different views from the plurality of different views.

Embodiments of the present invention facilitate flexible control over the amount of data that is cached in response to a data request (e.g., a query). A relevance threshold can be configured to cache more or less relevant data based on system and/or application needs and/or on the desires of a user or administrator. Thus, data having increased relevance can be cached without requiring all data to be cached. Accordingly, a user can be provided with relevant cached data in a manner that conserves system resources.

Figure 4:
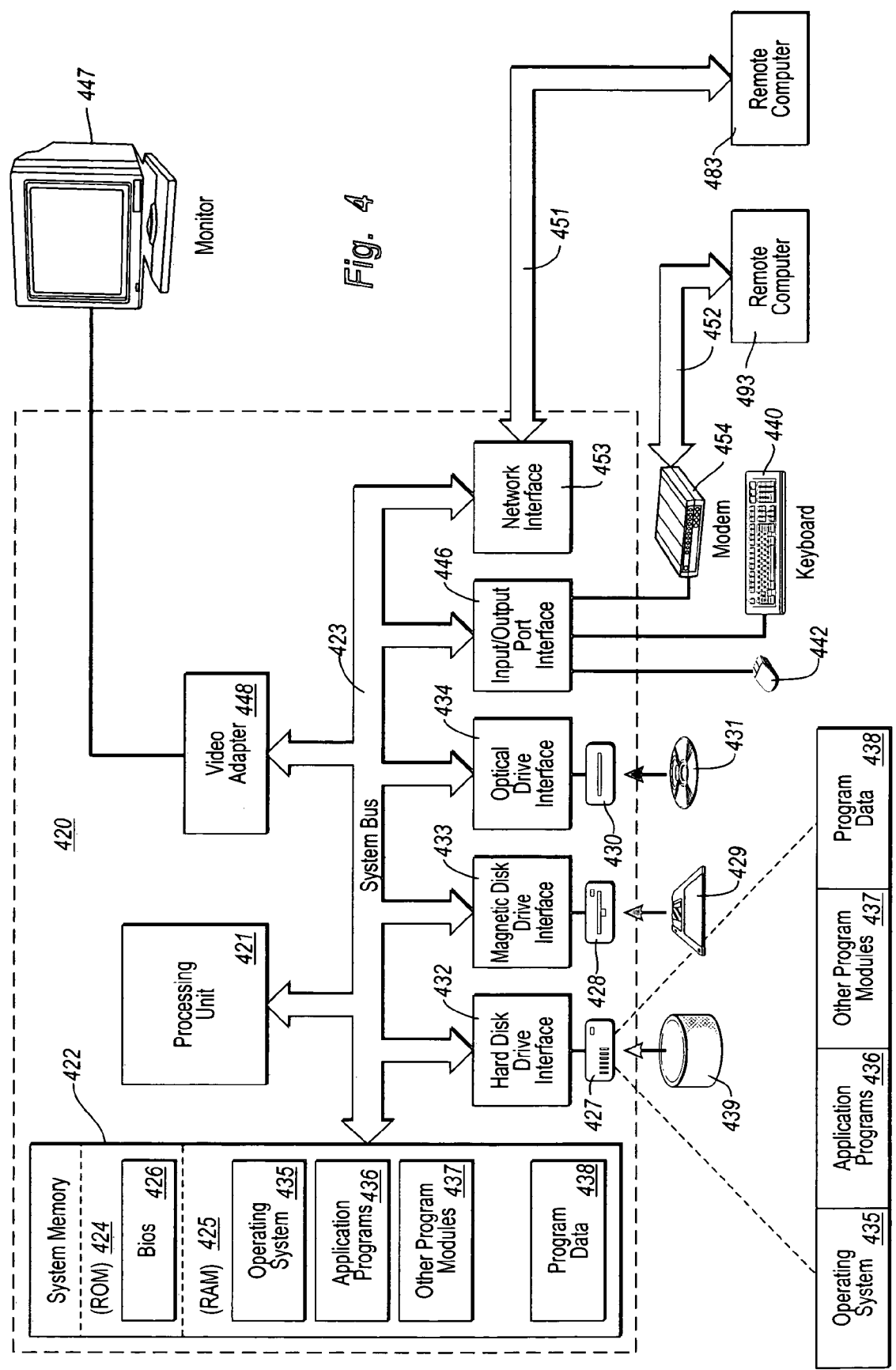
FIG. 4 illustrates a suitable operating environment for the principles of the present invention.

FIG. 4 illustrates a suitable operating environment for the principles of the present invention. FIG. 4 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 4, an example system for implementing the invention includes a general-purpose computing device in the form of computer system 420, including a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a peripheral bus, and a local bus using any of a variety of bus architectures. The system memory includes read only memory ("ROM") 424 and random access memory ("RAM") 425. A basic input/output system ("BIOS") 426, containing the basic routines that help transfer information between elements within computer system 420, such as during start-up, may be stored in ROM 424.

The computer system 420 may also include magnetic hard disk drive 427 for reading from and writing to magnetic hard disk 439, magnetic disk drive 428 for reading from or writing to removable magnetic disk 429, and optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide nonvolatile storage of computer-executable instructions, data structures, program modules, and other data for the computer system 420. Although the example environment described herein employs magnetic hard disk 439, removable magnetic disk 429 and removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 439, magnetic disk 429, optical disk 431, ROM 424 or RAM 425, including an operating system 435, one or more application programs 436, other program modules 437, and program data 438. A user may enter commands and information into computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Input/output interface 446 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 447 or other display device is also connected to system bus 423 via video interface 448. Other peripheral output devices (not shown), such as, for example, speakers and printers, can also be connected to computer system 420.

Computer system 420 is connectable to networks, such as, for example, an office-wide or enterprise-wide computer network, a home network, an intranet, and/or the Internet. Computer system 420 can exchange data with external sources, such as, for example, remote computer systems, remote applications, and/or remote databases over such networks.

Computer system 420 includes network interface 453, through which computer system 420 receives data from external sources and/or transmits data to external sources. As depicted in FIG. 4, network interface 453 facilitates the exchange of data with remote computer system 483 via link 451. Network interface 453 can logically represent one or more software and/or hardware modules, such as, for example, a network interface card and corresponding Network Driver Interface Specification ("NDIS") stack. Link 451 represents a portion of a network (e.g., an Ethernet segment), and remote computer system 483 represents a node of the network.

Likewise, computer system 420 includes input/output interface 446, through which computer system 420 receives data from external sources and/or transmits data to external sources. Input/output interface 446 is coupled to modem 454 (e.g., a standard modem, a cable modem, or digital subscriber line ("DSL") modem) via link 452, through which computer system 420 receives data from and/or transmits data to external sources. As depicted in FIG. 4, input/output interface 446 and modem 454 facilitate the exchange of data with remote computer system 493 via link 452. Link 452 represents a portion of a network and remote computer system 493 represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, modules including service agents, view creator modules, relevance modules, as well as associated data, including relevance thresholds, view schemas, reference schemas, data entities, references, and relationships can be stored and accessed from any of the computer-readable media associated with computer system 420. For example, portions of such modules and portions of associated program data may be included in operating system 435, application programs 436, program modules 437 and/or program data 438, for storage in system memory 422.

When a mass storage device, such as, for example, magnetic hard disk 439, is coupled to computer system 420, such modules and associated program data may also be stored in the mass storage device. In a networked environment, program modules depicted relative to computer system 420, or portions thereof, can be stored in remote memory storage devices, such as, system memory and/or mass storage devices associated with remote computer system 483 and/or remote computer system 493. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letter Patent is:

1. At a computer system configured to provide relevant cacheable data to client computer systems in response to data requests, a method for identifying relevant cacheable data, the method comprising:

an act of receiving a request for a requested data entity from among a plurality of data entities at the computer system, the request received from a client computer system;

an act of marking the requested data entity for caching at the client computer system based on the requested data entity being requested;

an act of accessing configured metadata that refers to an executable relevance algorithm that can return relevancy for one data entity from perspective of another data entity;

in response to the request and for each other data entity in the plurality of data entities:

an act of referring to the relevance algorithm to identify the relevancy of the other data entity from the perspective of the requested data entity, the relevance algorithm considering a length of a path from the requested data entity to the other data entity, the length of the path calculated from a number of links that are followed to traverse from the requested data entity to the other data entity;

an act of applying user configurable relevance rules to the identified relevancy of the relationship between the requested data entity and the other data entity to determine if the identified relevancy is within a relevancy threshold, the user configurable relevance rules providing flexible user control over an amount of data that is cached in response to a data request, the user configurable relevance rules defining how related another data instance is to be to the requested data instance for the other data instance to satisfy the relevancy threshold, the user configurable relevance rules configured to cache relevant information for more efficient availability based on the bandwidth environment of the client computer system;

an act of identifying one or more of the other data entities, from among the plurality of other data entities, determined to be relevant cacheable data from a perspective of the requested data entity based on results of applying the user configurable relevance rules;

an act of marking the identified one or more other data entities for caching at the client computer system based on the one or more other entities begin determined as relevant cacheable data; and an act of automatically transferring any marked data entities to the client computer system in response to the request for the requested data entity such that the one or more other data entities are transferred to the client computer system without actually having been requested, the marked data entities transferred in anticipation of a subsequent request for one of the one or more other data entities.

2. The method as recited in claim 1, wherein the act of referring to a relevance threshold comprises an act of referring to a relevance threshold that defines a cacheable data perimeter around the requested data entity, the cacheable data perimeter indicating the number of links from the requested data entity that can be followed before the configurable relevance rules indicate that data is no longer relevant to the requested data entity.

3. The method as recited in claim 2, wherein the act of determining that the other data entity satisfies the relevance threshold with respect to the requested data entity comprises an act of determining that the other data entity is within the cacheable data perimeter.

4. The method as recited in claim 1, wherein the act of identifying the relevancy of the other data entity from the perspective of the requested data entity comprises an act of identifying a static relationship from metadata contained in the requested data entity.

5. The method as recited in claim 1, wherein the act of identifying the relevancy of other data entity from the perspective of the requested data entity comprises an act of deriving a relationship based on the contents of the requested data entity.

6. The method as recited in claim 1, wherein the act of referring to a relevance threshold comprises an act of referring to a relevance threshold that defines relevance between data entities based on one or more of a user role, the data entity type of the requested data entity, and purported data usage of the requested data entity.

7. The method as recited in claim 6, wherein the act of referring to a relevance threshold that defines relevance between data entities based on one or more of a user role, the data entity type of the requested data entity, and purported data usage of the requested data entity comprises an act of referring to a relevance data structure, the relevance data structure combining one or more of a user role, the data entity type of the requested data entity, and purported data usage of the requested data entity with a number representing a cacheable data perimeter to indicate how related the other data entity is to be to the requested data entity for the other data entity to be identified as relevant cacheable data with respect to the requested data entity.

8. A computer program product for use at a computer system configured to provide relevant cacheable data to client computer systems in response to data requests, the computer program product for implementing a method for identifying relevant cacheable data, the computer program product comprising one or more computer-readable media having stored thereon computer-executable instructions that, when executed by a processor, cause the computer system to perform the following:

receive a request for a requested data entity from among a plurality of data entries at the computer system, the request received from a client computer system;

mark the requested data entity for caching at the client computer system based on the requested data entity being requested;

access configured metadata that refers to an executable relevance algorithm that can return relevancy for one data entity from the perspective of another data entity;

in response to the request and for each other data entity in the plurality of data entities:

refer to the relevance algorithm to identify the relevancy of the other data entity from the perspective of the requested data entity, the relevance algorithm considering a length of a path from the requested data entity to the other data entity, the length of the path calculated from a number of links that are followed to traverse from the requested data entity to the other data entity;

apply user configurable relevance rules to the identified relevancy of the relationship between the requested data entity and the other data entity to determine if the identified relevancy is within a relevancy threshold, the user configurable relevancy rules providing flexible user control over an amount of data that is cached in response to a data request, the user configurable relevance rules defining how related another data instance is to be to the requested data instance for the other data instance to satisfy the relevancy threshold, the user configurable relevance rules configured to cache relevant information for more efficient availability based the bandwidth environment of the client computer system;

identify one or more of the other data entities, from among the plurality of other data entries, determined to be relevant cacheable data from a perspective of the requested data entity based on results of applying the user configurable relevance rules;

mark the identified one or more other data entities for caching at the client computer system based on the one or more other entities being determined as relevant cacheable data with respect to the requested data entity; and automatically transfer any marked data entities to the client computer system in response to the request for the requested data entity such that the one or more other data entities are transferred to the client computer system without actually having been requested, the marked data entities transferred in anticipation of a subsequent request for one of the one or more other data entities.

9. The computer program product as recited in claim 8, wherein computer-executable instructions that, when executed, cause the computer system to refer to a relevance threshold comprise computer-executable instructions that, when executed, cause the computer system to refer to a relevance threshold that defines a cacheable data perimeter around the requested data entity, the cacheable data perimeter indicating the number of links from the requested data entity that can be followed before the configurable relevance rules indicate that data is no longer relevant to the requested data entity.

10. The computer program product as recited in claim 9, wherein computer-executable instructions that, when executed, cause the computer system to determine that the other data entity satisfies the relevance threshold with respect to the requested data entity comprise computer-executable instructions that, when executed, cause the computer system to determine that the other data entity is within the cacheable data perimeter, the cacheable data perimeter indicating the number of links from the requested data entity that can be followed before the configurable relevance rules indicate that data is no longer relevant to the requested data entity.

11. The computer program product as recited in claim 8, wherein computer-executable instructions that, when executed, cause the computer system to identify the relevancy of the other data entity from the perspective of the requested data entity comprise computer-executable instructions that, when executed, cause the computer system to identify a static relationship based on metadata contained in the requested data entity.

12. The computer program product as recited in claim 8, wherein computer-executable instructions that, when executed, cause the computer system to identify the relevancy the other data entity from the perspective of the requested data entity comprise computer-executable instructions that, when executed, cause the computer system to dynamically derive a relationship based on the contents of the requested data entity at run-time.

13. The computer program product as recited in claim 8, wherein computer-executable instructions that, when executed, cause the computer system to refer to a relevance threshold comprise computer-executable instructions that, when executed, cause the computer system to refer to a relevance threshold that defines relevance between data entities based on one or more of a user role, the data entity type of the requested data entity, and the purported data usage of the requested data entity.

14. The computer program product as recited in claim 13, wherein computer-executable instructions that, when executed, cause the computer system to refer to a relevance threshold that defines relevance between data entities based on one or more of a user role, the data entity type of the requested data entity, and the purported data usage of the requested data entity comprise computer-executable instructions that, when executed, cause the computer system to refer to a relevance data structure, the relevance data structure combining one or more of a user role, the data entity type of the requested data entity, and purported data usage of the requested data entity with a number representing a cacheable data perimeter to indicate how related the other data entity is to be to the requested data entity for the other data entity to be identified as relevant cacheable data with respect to the requested data entity.

15. A system for identifying relevant data to cache at client computer systems, the system comprising:

one or more processors;
system memory;
one or more computer readable-media having stored thereon a service agent, the service agent configured to:
receive a request for a requested data entity from among a plurality of data entries at the computer system, the request received from a client computer system;
mark the requested data entity for caching at the client computer system based on the requested data entity being requested;
access configured metadata that refers to an executable relevance algorithm that can return relevancy for one date entity from the perspective of another data entity;
in response to the request and for each other data entity in the plurality of data entities:
refer to the relevance algorithm to identify the relevancy of the other data entity from the perspective of the requested data entity, the relevance algorithm considering a length of a path from the requested data entity to the other data entity, the length of the path calculated from a number of links that are followed to traverse from the requested data entity to the other data entity;
apply user configurable relevance rules to the identified relevancy of the relationship between the requested data entity and the other data entity to determine if the identified relevancy is within a relevancy threshold, the user configurable relevance rules providing flexible user control over an amount of data that is cached in response to a data request, the user configurable relevance rules defining how related another data instance is to be to the requested data instance for the other data instance to satisfy the relevancy threshold, the user configurable relevance rules configured to cache relevant information for more efficient availability based on the bandwidth environment of the client computer system;
identify one or more of the other data entities, from among the plurality of other data entries, determined to be relevant cacheable data from a perspective of the requested data entity based on results of applying the user configurable relevance rules;
mark the identified one or more other data entities for caching at the client computer system based on the one or more other entities being determined as relevant cacheable data with respect to the requested data entity; and
automatically transfer any marked data entities to the client computer system in response to the request for the requested data entity such that the one or more other data entities are transferred to the client computer system without actually having been requested, the marked data entities transferred in anticipation of a subsequent request for one of the one or more other data entities.

* * * * *